April 16, 1963 A. A. POLLIA 3,085,820
DETACHABLE PIPE COUPLING INCLUDING A DETACHABLE FLANGE
Filed July 21, 1958
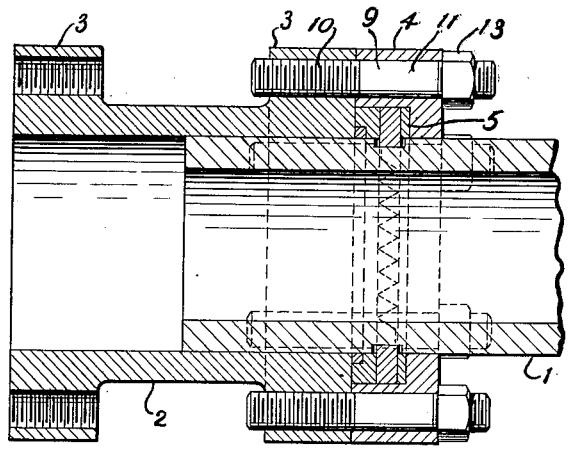
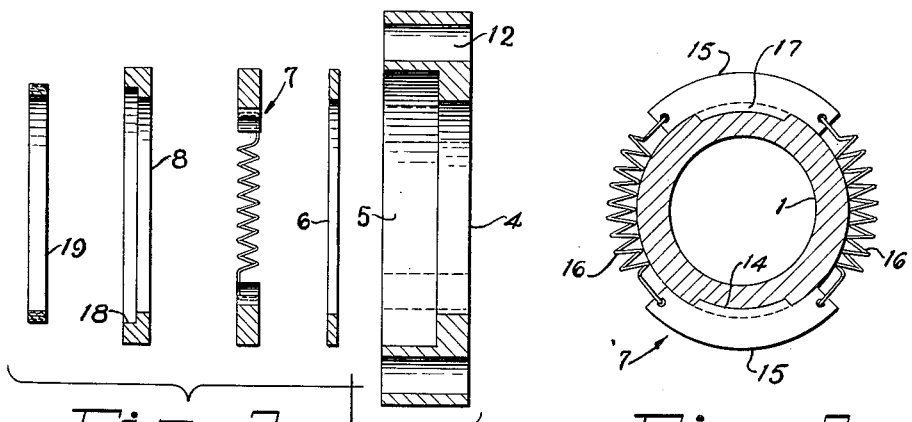
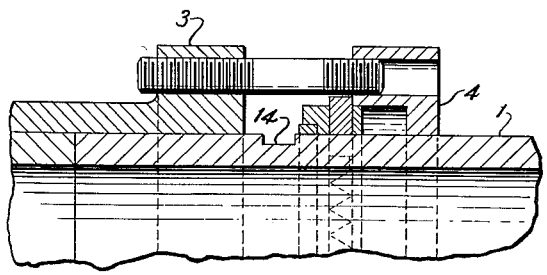
INVENTOR.
ANDREW A. POLLIA
BY
ATTORNEY

United States Patent Office 3,085,820
Patented Apr. 16, 1963

3,085,820
DETACHABLE PIPE COUPLING INCLUDING A DETACHABLE FLANGE
Andrew A. Pollia, 851 Post St., San Francisco, Calif.
Filed July 21, 1958, Ser. No. 749,754
4 Claims. (Cl. 285—368)

The present invention relates to improvements in pipe couplings, and its principal object is to provide a pipe coupling which may be easily applied in field operations, and provides a certain flexibility, allowing of expansion and contraction, due to changes in temperature and other causes.

It is further proposed to provide a coupling of the character described which is leak-proof and in which the sealing medium may be readily renewed without disturbing the two pipe sections to be joined.

It is additionally proposed to provide for a special locking system including a specially designed key assembly which may be readily applied and readily removed, and which may be given a desired amount of play to respond to changes in temperatures and pressure.

While my invention will be described principally as a pipe coupling, the principles involved apply equally to shaft couplings and it should be understood that the term pipe coupling where used is intended to cover shaft couplings.

Further objects and advantages of my invention will be apparent as the specification proceeds, and the new and useful features of my pipe coupling will be fully defined in the claims attached thereto.

The preferred form of my invention is illustrated in the accompanying drawing, forming part of this application, in which:

FIGURE 1 shows a longitudinal section through my pipe coupling;

FIGURE 2, an exploded view showing the various parts of the locking assembly used in my invention;

FIGURE 3, an end view of a key assembly used in my invention, as applied to a pipe section; and FIGURE 4, a fragmentary axial section showing the various parts at an intermediate stage of the assembling operation.

While I have shown only the preferred form of my invention, it should be understood that various changes or modificaitons may be made within the scope of the claims hereto attached, without departing from the spirit of the invention.

Referring to the drawing in detail, the two members to be coupled are a pipe section 1 and a fitting 2. The latter may be in the form of a short, straight pipe having flanges 3 at opposite ends, or in any other desired form, such as an elbow, a T-joint or whatever fitting may be called for in the specifications.

The pipe section is made to have a sliding fit in the fitting and, as far as the present invention is concerned, the pipe section may be hollow as shown, or made solid to present a shaft.

My interlocking assembly comprises, in its principal features, a bushing 4 slidable on the pipe section and formed with an annular recess 5 adjacent the pipe section, a bearing rim 6 adapted for sliding into the recess, a key assembly 7 adapted for sliding into the recess when properly positioned, and a packing ring 8 adapted to follow the key assembly, all the parts having a combined thickness corresponding to the depth of the recess, so that the rear face of the packing ring comes flush with the rear face of the bushing when the parts are finally assembled, as in FIGURE 1.

The bushing 4 may be tightened upon the adjacent flange 3 by a series of bolts 9 which may be threaded into the flange, as at 10, and present smooth portions 11 outside the flange to slidably receive the bushing which is formed with corresponding perforations 12. Nuts 13 screwed on the outer ends of the bolts tighten the bushing upon the flange.

Referring now to the interlocking means for the bushing and the pipe section, it will be noted that the pipe section is formed, at a desired distance from its end, with a pair of oppositely disposed, circumferential grooves 14 having concentric bottoms, which, in the final assembly, are disposed close to the end of the fitting.

The key assembly 7 comprises two annular keys 15 interconnected by coiled springs 16 in such a manner that the springs draw the keys upon the pipe section, the keys being concentric to the pipe section. Each of the keys has an inwardly projecting flange 17 with an inner curve to fit into one of the grooves 14, the springs urging the flanges 17 into the grooves 14, when the flanges have reached the proper position with respect to the grooves.

The grooves are preferably made somewhat wider than the flanges so as to allow a certain amount of axial movement of the keys within the grooves to allow of expansion and contraction and to compensate for certain slight inaccuracies.

The packing ring 8 is made to fit in the recess 5 and is formed with an internal groove 18 to receive the packing 19 which originally is wider than the groove, so as to be compressed by impact with the end of the fitting 2.

In assembling the parts, the operator, with the pipe section 1 in free condition, first pushes the bushing 4 upon the end of the pipe section, with the recess 5 facing rearwardly, to a point well forward of the grooves 14 in the pipe section.

Next, the operator pushes the ring 6 up against and into the bushing.

Then he applies the key assembly, and pushes it against the bushing, causing it to clear the grooves 14. Since, in this position, well beyond the grooves, the flanges 17 bear on the surface of the pipe section, the outer circumferences of the keys project beyond the recess 5, as shown in FIGURE 4, so that the keys may not enter the recess.

Next, the packing ring 8 is applied to come up against the key assembly, leaving the entire bushing assembly to clear the grooves 14 in the pipe section, as shown in FIGURE 4, while the packing 19 is appplied on the opposite sides of the grooves.

Now, the end of the pipe section is introduced into the fitting 2 to a point where the grooves 14 are spaced from the fitting approximately by the width of the packing ring 8.

The packing ring is then pushed over the grooves 14 and against the fitting to pass over and compress the packing 19 which, in its free state, is somewhat wider than the groove 18.

Next, the key assembly is adjusted to make the flanges 17 register with the grooves 14 and is pushed up against the packing ring which will cause the key flanges to snap into the grooves under the influence of the springs 16.

Now, the bushing is free to pass over the keys and is adjusted to cause the holes 12 to register with the bolts 9, and is pushed over the key assembly and the packing ring and up against the fitting.

This definitely locks the keys in place since now the outer circumference of the keys corresponds to the inner circumference of the recess in the bushing. Application of the nuts 13 completes the assembly.

In case it becomes necessary to renew the packing, the operator will first remove the nuts 13, then retract the bushing 4, which allows the keys to be expanded and retracted. Upon retraction of the packing ring 8, the parts assume the position of FIGURE 4, leaving the packing open for inspection and renewal, whereupon the parts may be re-assembled without disturbing either the pipe section or the fitting.

In view of the fact that the groove 14 is somewhat wider than the width of the key flanges, the latter are free to move in response to expansion and contraction of the pipe section.

I claim:

1. In a pipe coupling, a fitting having a cylindrical end formed with a flush face, a pipe section having an end slidably received in said end of the fitting and having a pair of opposed annular grooves in the outer surface thereof, the grooves being limited in arc length to leave a large portion of the pipe section of full pipe wall thickness, a bushing slidable on the pipe section and having an annular recess facing said fitting, means for urging said bushing toward said fitting, a pair of arcuate keys having inwardly projecting flanges fitting in said grooves and with the confronting ends of the keys being spaced apart, helical tension springs connecting the confronting ends of said keys for urging the inwardly projecting flanges into the grooves, a packing ring encircling said pipe section and having a flat outer face bearing against said keys and a flat inner face confronting said fitting, said packing ring and said keys when engaged in said grooves and said packing ring being proportioned to fit snugly into said annular recess in the bushing, the inner periphery of said packing ring at said inner face being formed with an annular gasket groove, and a resiliently compressible gasket mounted in said gasket groove and proportioned to extend axially beyond said packing ring whereby urging of the bushing toward the fitting will compress the gasket into the gasket groove and effect a seal between said packing ring and said pipe section and between said packing ring and said fitting.

2. In combination, a pipe section having a pair of concentric grooves in substantially the same radial plane formed in the outer surface thereof and near one end thereof, the grooves being limited in arc length to leave a large portion of the pipe section of full wall thickness, an apertured bushing, said aperture being of a diameter slightly larger than the outside diameter of the pipe and slidable over the pipe section to any desired position beyond the grooves, a key assembly slidable on the pipe section and including a pair of keys concentric to the pipe section having internal flanges for fitting in the grooves, and a pair of resilient means having their ends attached to the confronting ends of the keys, said resilient means having its maximum cross-sectional dimension not exceeding the axial thickness of said keys and a length effective to be retained under tension when said key assembly is positioned in said grooves in encircling relation to said pipe section, said bushing having an annular recess adjacent the pipe section proportioned to snugly fit around the key assembly so as to lock the internal flanges of the keys in the grooves when the bushing is advanced over the key assembly whereby said bushing will be securely held against axial movement of said pipe section when secured to a confronting bushing.

3. In combination, a pipe section having a pair of concentric grooves in the surface thereof and near one end thereof, the grooves being limited in arc length to leave a large portion of the pipe section of full pipe thickness, a bushing slidable over the end of the pipe section to any desired position beyond the grooves and having an annular recess adjacent the pipe section, a key assembly slidable on the pipe section and including a pair of keys concentric to the pipe section and internal flanges adapted for fitting in the grooves, the keys having spaced opposed ends and spring means connecting the same, the key assembly being proportioned to snugly fit into the recess so as to lock the keys in position when the bushing is advanced over the key assembly, a bearing ring mounted in said recess internally of the key assembly, and a packing ring mounted in said recess outwardly of said key assembly, said bearing and packing rings and said key assembly being dimensioned to bring the inner face of the packing ring flush with the inner face of the bushing.

4. A pipe coupling as defined in claim 3 in which the inner periphery of said packing ring at said inner face is formed with an annular gasket groove, and a resiliently compressible gasket is mounted in said gasket groove and proportioned to extend axially beyond the inner face of the packing ring whereby urging of said bushing toward the flush end of a complementary member will compress said gasket into said gasket groove and effect a seal between said packing ring and said pipe section and between said packing ring and the complementary member.

References Cited in the file of this patent

UNITED STATES PATENTS

| | | |
|---|---|---|
| 608,613 | Linich | Aug. 9, 1898 |
| 888,165 | Harrington | May 19, 1908 |
| 1,675,808 | Kliss | July 3, 1928 |
| 1,851,574 | Fiederlein | Mar. 29, 1932 |
| 1,873,621 | Moore | Aug. 23, 1932 |
| 2,104,180 | Barker | Jan. 4, 1938 |
| 2,178,549 | Block | Nov. 7, 1939 |
| 2,479,104 | Dreyer | Aug. 16, 1949 |
| 2,515,629 | Chambers | July 18, 1950 |
| 2,784,990 | Pollia | Mar. 2, 1957 |